United States Patent
Peiffer et al.

(10) Patent No.: US 6,630,224 B2
(45) Date of Patent: Oct. 7, 2003

(54) MATT, BIAXIALLY ORIENTED POLYESTER FILM

(75) Inventors: Herbert Peiffer, Mainz (DE); Guenther Crass, Taunusstein-Wehen (DE); Gottfried Hilkert, Saulheim (DE)

(73) Assignee: Mitsubishi Polyester Film GmbH, Wiesbaden (DE)

( * ) Notice: Subject to any disclaimer, the term of this patent is extended or adjusted under 35 U.S.C. 154(b) by 0 days.

(21) Appl. No.: 09/950,456

(22) Filed: Sep. 10, 2001

(65) Prior Publication Data

US 2002/0068159 A1 Jun. 6, 2002

(30) Foreign Application Priority Data

Oct. 14, 2000 (DE) .......................................... 100 51 084

(51) Int. Cl.$^7$ .......................... B32B 27/08; B32B 27/18; B32B 27/20; B32B 27/36
(52) U.S. Cl. ...................... 428/141; 428/35.2; 428/35.5; 428/35.7; 428/36.92; 428/337; 428/338; 428/323; 428/331; 428/480; 428/910; 264/288.4; 264/290.2; 525/437; 525/444; 525/448; 524/492; 524/493
(58) Field of Search ................................ 428/141, 212, 428/215, 216, 480, 910, 337, 338, 323, 331, 35.2, 35.5, 35.7, 36.92; 264/290.2, 288.4; 525/437, 444, 448; 524/492, 493

(56) References Cited

U.S. PATENT DOCUMENTS

| | | | |
|---|---|---|---|
| 3,154,461 A | | 10/1964 | Johnson |
| 4,399,179 A | * | 8/1983 | Minami et al. ............. 428/212 |
| 4,568,616 A | * | 2/1986 | Seifried et al. ............. 428/480 |
| 4,990,400 A | | 2/1991 | Endo et al. |
| 5,073,435 A | | 12/1991 | Eyraud et al. |
| 6,130,278 A | * | 10/2000 | Hibiya et al. ................ 524/322 |
| 6,238,782 B1 | * | 5/2001 | Hellmann et al. ...... 264/171.11 |
| 2002/0068158 A1 | * | 6/2002 | Peiffer et al. ............... 428/220 |
| 2002/0071945 A1 | * | 6/2002 | Peiffer et al. ............... 428/220 |

FOREIGN PATENT DOCUMENTS

| | | |
|---|---|---|
| EP | 0 377 495 A2 | 7/1990 |
| EP | 0 976 548 A2 | 2/2000 |

OTHER PUBLICATIONS

EP 0 144 878 A2=US 4,493,872, American Hocchst Corp., Jun. 19, 1985.
DE 2 353 347 A=US 3,944,699, Mathews et al., May 9, 1974, Mar. 16, 1976.

* cited by examiner

Primary Examiner—Vivian Chen
(74) Attorney, Agent, or Firm—ProPat, L.L.C.

(57) ABSTRACT

The invention relates to a matt, biaxially oriented polyester film having at least one matt base layer (B) which comprises at least 70% by weight of thermoplastic polyester, and also a pigment system with narrow grain size distribution. The invention further relates to the use of the film and to a process for its production. The film of the invention has characteristic matt surfaces and has good suitability for use as a packaging film or for industrial applications.

25 Claims, 2 Drawing Sheets

MATT, BIAXIALLY ORIENTED POLYESTER FILM

BACKGROUND OF THE INVENTION

1. Field of the Invention

The invention relates to a matt, biaxially oriented polyester film which comprises at least one matt base layer (B), at least 70% by weight of which is composed of a thermoplastic polyester. The invention further relates to the use of this film and to a process for its production.

2. Description of the Related Art

The film of the invention has characteristic matt surfaces and has good suitability for use as a packaging film or for industrial applications.

The packaging industry has a high requirement for transparent, high-gloss plastic films, e.g. biaxially oriented polypropylene films or biaxially oriented polyester films. In addition, there is increasing requirement for films of this type in which the surfaces are not high-gloss but have a characteristic matt appearance giving, for example, the packaging an appearance which is particularly attractive and therefore effective for promotional purposes.

U.S. Pat. No. 3,154,461 claims a process for producing a biaxially oriented matt-surface film from thermoplastic (e.g. polyethylene terephthalate, polypropylene), in which the film comprises incompressible particles (e.g. calcium carbonate, silicon dioxide) with size of from 0.3 to 20 $\mu$m and at a concentration of from 1 to 25%. The application concerned also claims the matt film produced by the process according to the invention. The degree of mattness of the film produced by the process according to the invention is unsatisfactory for many applications.

DE-A 23 53 347 describes a process for producing a milky polyester film having one or more layers, which comprises preparing a mixture made from particles of a linear polyester with from 3 to 27% by weight of a homopolymer or copolymer of ethylene or propylene, extruding the mixture as a film, quenching the film, and orienting the same by orientation in directions running perpendicular to one another, and heat-setting the film. A disadvantage of the process is that it is not possible to reuse the cut material arising during production of the film (essentially a mixture of polyester and ethylene copolymer or propylene copolymer) as regrind without yellowing of the film. This makes the process uneconomic, and the yellowish film produced with regrind was unacceptable to the market. On increasing the concentration of the copolymer in the polyester, the film generally loses its milky character and becomes white with high opacity.

It was therefore an object of the present invention to provide a matt, biaxially oriented polyester film not having the disadvantages of the prior art films mentioned, but having in particular a high degree of mattness, very high ease of production and very good processibility. In addition, care should be taken that the film can also be processed on high-speed machinery. It should moreover be ensured that cut material occurring during film production can be reintroduced into the production process as regrind during production of the film in amounts of up to 70% by weight, based on the total weight of the film, without any significant adverse effect on the physical or optical properties of the film.

SUMMARY OF THE INVENTION

According to the invention, the object is achieved by means of a matt, biaxially oriented polyester film having at least one matt base layer (B) which comprises at least 70% by weight of thermoplastic polyester, where the base layer (B) also comprises a pigment system characterized by the following features a) the median diameter of the pigment grains ($d_{50}$) is in the range from 2 to 5 $\mu$m, b) the scattering of the distribution of the grain size of the pigment grains, expressed via the SPAN 98, is less than or equal to 1.9, and the concentration of the pigment grains is in the range from 1.0 to 10% by weight, based on the total weight of the film.

DETAILED DESCRIPTION OF THE PREFERRED EMBODIMENTS

Figure 1:
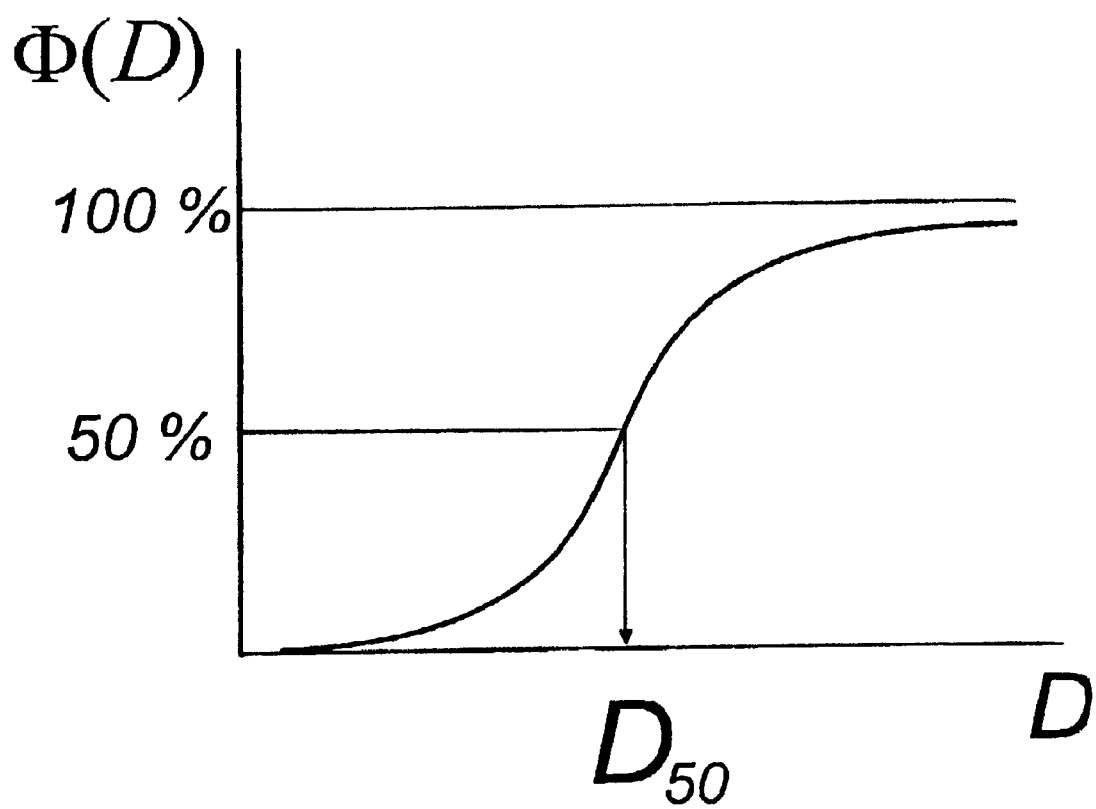
FIGS. 1 and 2 are graphs illustrating the methods of calculating the median particle diameter $d_{50}$ and the SPAN 98, respectively.

According to the invention, the film is preferably composed of one layer, the film in this case encompassing only the base layer (B).

At least 70% by weight of the base layer (B) is preferably composed of a thermoplastic polyester. Polyesters suitable for this purpose are those made from ethylene glycol and terephthalic acid (polyethylene terephthalate, PET), from ethylene glycol and naphthalene-2,6-dicarboxylic acid (polyethylene 2,6-naphthalate, PEN), from 1,4-bishydroxymethylcyclohexane and terephthalic acid (poly-1,4-cyclohexanedimethylene terephthalate, PCDT), or else made from ethylene glycol, naphthalene-2,6-dicarboxylic acid and biphenyl-4,4'-dicarboxylic acid (polyethylene 2,6-naphthalate bibenzoate, PENBB). Particular preference is given to polyesters at least 90 mol %, preferably at least 95 mol %, of which is composed of ethylene glycol units and terephthalic acid units, or of ethylene glycol units and naphthalene-2,6-dicarboxylic acid units. In one particularly preferred embodiment, the base layer is composed of polyethylene terephthalate homopolymer. The remaining monomer units derive from other aliphatic, cycloaliphatic or aromatic diols and, respectively, dicarboxylic acids.

Other examples of suitable aliphatic diols are diethylene glycol, triethylene glycol, aliphatic glycols of the formula HO—$(CH_2)_n$—OH, where n is an integer from 3 to 6 (in particular 1,3-propanediol, 1,4-butanediol, 1,5-pentanediol and 1,6-hexanediol) and branched aliphatic glycols having up to 6 carbon atoms. Among the cycloaliphatic diols, mention should be made of cyclohexanediols (in particular 1,4-cyclohexanediol). Examples of other suitable aromatic diols have the formula HO—$C_6H_4$—X—$C_6H_4$—OH, where X is —$CH_2$—, —$C(CH_3)_2$—, —$C(CF_3)_2$—, —O—, —S— or —$SO_2$—. Bisphenols of the formula HO—$C_6H_4$—$C_6H_4$—OH are also very suitable.

Other aromatic dicarboxylic acids are preferably benzenedicarboxylic acids, naphthalene dicarboxylic acids (such as naphthalene-1,4- or -1,6-dicarboxylic acid), biphenyl-x,x'-dicarboxylic acids (in particular biphenyl-4,4'-dicarboxylic acid), diphenylacetylene-x,x'-dicarboxylic acids (in particular diphenylacetylene-4,4'-dicarboxylic acid) or stilbene-x,x'-dicarboxylic acids. Among the cycloaliphatic dicarboxylic acids mention should be made of cyclohexanedicarboxylic acids (in particular cyclohexane-1,4-dicarboxylic acid). Among the aliphatic dicarboxylic acids, the $C_3$–$C_{19}$ alkanediacids are particularly suitable, and the alkane moiety here may be straight-chain or branched.

One way of preparing the polyesters is the transesterification process. Here, the starting materials are dicarboxylic esters and diols, which are reacted using the customary transesterification catalysts, such as the salts of zinc, of calcium, of lithium, of magnesium or of manganese. The intermediates are then polycondensed in the presence of well-known polycondensation catalysts, such as antimony trioxide or titanium salts. Another equally good preparation method is the direct esterification process in the presence of polycondensation catalysts. This starts directly from the dicarboxylic acids and the diols.

To achieve the desired mattness or the desired degree of mattness, the base layer (B) (the base layer (B) in the single-layer embodiment being identical with the film) comprises at least the pigment system of the invention, in an effective amount of from 1.0 to 10.0% by weight, based on the weight of the base layer (B). In the preferred embodiment of the film of the present invention, the pigment concentration is from 1.1 to 7.5% by weight, particularly preferably from 1.2 to 5.0% by weight.

Typical particle systems advantageous for the degree of mattness of the film are inorganic and/or organic particles, such as calcium carbonate, amorphous silica, talc, magnesium carbonate, barium carbonate, calcium sulfate, barium sulfate, lithium phosphate, calcium phosphate, magnesium phosphate, aluminum oxide, lithium fluoride, the calcium, barium, zinc or manganese salts of the dicarboxylic acids used, carbon black, titanium dioxide, kaolin or crosslinked polymer particles, e.g. polystyrene particles or acrylate particles.

It is also possible to select mixtures of two or more different particle systems, or mixtures of particle systems of the same chemical makeup but of different particle size. The particles may be added to the polymers of each layer of the film in the respective advantageous concentrations, e.g. as a glycolic dispersion during the polycondensation, or by way of masterbatches during extrusion.

Preferred particles are $SiO_2$ in colloidal or in chain-type form. These particles give very good incorporation into the polymer matrix.

It has been found that the particle diameter and the scattering of the pigment system used have a decisive effect on the degree of mattness and the production of the film.

To achieve a very high degree of mattness (i.e. very low gloss) and to achieve good ease of production, the film according to the present invention comprises a pigment system in which the median diameter of the pigment grains (the $d_{50}$ value) is in the range from 2.0 to 5.0 µm, and in which the scattering of the distribution of the grain size of the pigment grains (expressed via the SPAN 98) is less than or equal to 1.9.

In the preferred embodiment, the film of the present invention comprises a pigment system in which the median diameter of the pigment grains is in the range from 2.1 to 4.9 µm and scattering of the distribution of the grain size of the pigment grains is less than or equal to 1.8. In the particularly preferred embodiment, the film of the present invention comprises a pigment system in which the median diameter of the pigment grains is in the range from 2.2 to 4.8 µm and the scattering of the distribution of the grain size of the pigment grains is less than or equal to 1.7.

If, in contrast, the film comprises a pigment system whose median diameter and scattering lie outside the range of the invention, this has a lasting adverse effect on the degree of mattness and/or the ease of production of the film.

If, in contrast, the film comprises a pigment system whose median diameter is greater than 5.0 µm and whose scattering is greater than 1.6, the degree of mattness and the ease of production of the film become poorer. This means that the gloss increases to an undesirable extent, and the film has more tendency to break-off during production.

If, in contrast, the film comprises a pigment system whose median diameter of the pigment grains is less than 2.0 µm and whose scattering is greater than 1.9, the degree of mattness of the film and the ease of production of the film both become poorer. This means that the gloss increases to an undesirable extent, and the film has more tendency to break-off during production.

In an advantageous embodiment, the film comprises, besides the ethylene terephthalate homopolymer or the ethylene terephthalate copolymer, another polymeric component I. This component I is a copolymer composed of the condensation product of the following monomers or of their derivatives capable of forming polyesters:

a) from 65 to 95 mol % of isophthalic acid;
b) from 0 to 30 mol % of at least one aliphatic dicarboxylic acid having the formula $HOOC(CH_2)_nCOOH$, where n is in the range from 1 to 11;
c) from 5 to 15 mol % of at least one sulfomonomer containing an alkali metal sulfonate group on the aromatic moiety of a dicarboxylic acid;
d) a copolymerizable aliphatic or cycloaliphatic glycol having from 2 to 11 carbon atoms, in the stoichiometric amount necessary to form 100 mol % of condensate;

where each of the percentages is based on the total amount of monomers forming component I. For a detailed description of component I see also EP-A-0 144 878, which is expressly incorporated herein by way of reference.

Component I is advantageously added as another polymeric component of the base layer (B), and its proportion may be up to 30% by weight. In this case component I forms a blend or a mixture with the other polymers present in this layer, or else forms a copolymer by transesterification during extrusion.

For the purposes of the present invention, mixtures are mechanical mixtures prepared from the individual components. For this, the individual constituents are generally combined in the form of small-dimensioned compressed moldings, e.g. lenticular or bead-shaped pellets, and mixed with one another mechanically, using a suitable agitator. Another way of producing the mixture is to feed the component I and the appropriate polymer for the respective layer separately to the extruder for the base layer or other layer, and to carry out mixing in the extruder and/or in the downstream systems for transporting the melt.

For the purposes of the present invention, a blend is an alloy-like composite of the individual components which can no longer be separated into the initial constituents. A blend has properties like those of a homogeneous material and can therefore be characterized by appropriate parameters.

In one advantageous embodiment, the matt film of the invention is characterized by the following set of parameters:

a) the film has a roughness expressed in terms of its $R_a$ value in the range from 150 to 1000 nm, preferably 175 to 950 nm and particularly preferably 200 to 900 nm. Values below 150 nm have an adverse effect on the degree of mattness of the surface, and values above 1000 nm impair the optical properties of the film.
b) The value measured for gas flow is in the range from 1 to 50 s, preferably in the range from 1 to 45 s. At values above 50, the degree of mattness of the film is adversely affected.

The base layer (B) may also comprise conventional additives, such as stabilizers. Examples of stabilizers advantageously used are phosphorus compounds, such as phosphoric acid or phosphoric esters.

The thickness of the novel polyester film may vary within certain limits. It is advantageously from 3 to 350 µm, in particular from 4 to 300 µm, preferably from 5 to 250 µm.

Production process:

The invention also provides a process for producing the polyester film of the invention by the extrusion process known per se from the literature.

The procedure for this process is that the melt corresponding to the film is extruded through a flat-film die, the resultant film is drawn off for solidification on one or more rolls, the film is then biaxially stretched (oriented), and the biaxially stretched film is heat-set and, if desired, corona- or flame-treated on the surface layer intended for treatment.

As is usual in extrusion, the polymer or the polymer mixture for the film is first compressed and plasticized in an extruder, and any additives used may already be present in the polymer or the polymer mixture. The melt is then simultaneously extruded through a flat-film die (slot die), and the extruded melt is drawn off on one or more cooled take-off rolls, whereupon the melt cools and solidifies to form a prefilm.

The biaxial orientation is generally carried out sequentially, preferably orienting first longitudinally (i.e. in the machine direction=MD) and then transversely (i.e. perpendicularly to the machine direction=TD). This gives orientation of the polymer chains. The longitudinal orientation can be carried out with the aid of two rolls running at different speeds corresponding to the desired stretching ratio. For the transverse orientation use is generally made of an appropriate tenter frame, clamping both edges of the film and then drawing toward the two sides at an elevated temperature.

The temperature at which the orientation is carried out may vary over a relatively wide range and depends on the film properties desired. The longitudinal stretching is generally carried out at from about 80 to 130° C., and the transverse stretching at from about 90 to 150° C. The longitudinal stretching ratio is generally in the range from 2.5:1 to 6:1, preferably from 3:1 to 5.5:1. The transverse stretching ratio is generally in the range from 3.0:1 to 5.0:1, preferably from 3.5:1 to 4.5:1. Prior to the transverse stretching, one or both surfaces of the film may be in-line coated by the known processes. The in-line coating may serve, for example, to give improved adhesion of a metal layer or of any printing ink subsequently to be applied, or else to improve antistatic performance or processing performance.

For producing a film with a very high degree of mattness (=very low gloss) and improved transparency, it has proven advantageous for the planar orientation Δp of the film to be less than 0.168, preferably less than 0.164 and very preferably less than 0.160. In such cases the roughness of the film is increased in particular, and this leads to particularly low gloss in the film.

The significant variables affecting the planar orientation Δp have been found to be the longitudinal and transverse stretching parameters, and also the SV of the raw material used. The processing parameters include in particular the longitudinal and transverse stretching ratios ($\lambda_{MD}$ and $\lambda_{TD}$), the longitudinal and transverse stretching temperatures ($T_{MD}$ and $T_{TD}$), the film web speed and the nature of the stretching, in particular that in the longitudinal direction of the machine. For example, if a machine gives a planar orientation of the film Δp=0.171 with the following set of parameters: $\lambda_{MD}$=4.8 and $\lambda_{TD}$=4.0, and stretching temperatures longitudinally and transversely $T_{MD}$=from 80 to 118° C. and $T_{TD}$=from 80 to 122° C., then increasing the longitudinal stretching temperature to $T_{MD}$=from 80 to 125° C., or increasing the transverse stretching temperature to $T_{TD}$=from 80 to 135° C., or lowering the longitudinal stretching ratio to $\lambda_{MD}$=4.0, or lowering the transverse stretching ratio to $\lambda_{TD}$=3.6 gives planar orientation Δp within the desired range. The film web speed here is 300 m/min, and the SV of the material is about 730. In the case of longitudinal stretching, the data specified are based on what is known as N-TEP stretching, which is composed of a low-orientation stretching step (LOE=low-orientation elongation) and of a high-orientation stretching step (REP=rapid elongation process). Other stretching systems in principle give the same conditions, but the values for the respective process parameters may be slightly different. The temperatures given for longitudinal stretching are based on the respective roll temperatures, and those for transverse stretching are based on the film temperatures measured by IR.

In the heat-setting which follows, the film is held for from 0.1 to 10 s at a temperature in the range from 150 to 250° C. The film is then wound up in a conventional manner One or both surfaces of the film is/are preferably corona- or flame-treated by one of the known methods after biaxial stretching. The intensity of treatment is adjusted so as to give surface tension in the range above 45 mN/m.

The film may also be coated to establish other desired properties. Typical coatings are those with adhesion-promoting, antistatic, slip-enhancing or release effect. It is, of course, possible for these additional layers to be applied to the film by in-line coating using aqueous dispersions after the longitudinal stretching step and prior to the transverse stretching step.

The matt film of the invention has excellent optical properties, i.e. low gloss and high transparency, very good handling, and very good processing performance.

In addition, it has been ensured that the cut material (regrind) can be reintroduced to the extrusion process during production of the film in amounts of from 20 to 70% by weight, based on the total weight of the film, without any significant adverse effect on the physical properties of the film, in particular its appearance.

The film therefore has excellent suitability for use in flexible packaging and specifically wherever its excellent optical properties and its good processibility are of particular importance, as particularly in its use on high-speed packaging machinery. The table below (Table 1) gives once again a quick overview of the most important film properties of the invention.

TABLE 1

| | Range | | | | |
| --- | --- | --- | --- | --- | --- |
| | General | Preferred | Particularly preferred | Unit | Test method |
| Film properties | | | | | |
| Gloss, 60° | <80 | <70 | <60 | | DIN 67530 |
| COF | <0.5 | <0.45 | <0.40 | | DIN 53375 |
| Average roughness $R_a$ | 150–1000 | 175–950 | 200–900 | nm | DIN 4768, cuttoff of 0.25 mm |
| Range of value measured for gas flow | 1–50 | 1–45 | | sec | internal |
| Haze | <90 | | | % | ASTM D 1003-52 |
| Planar orientation (optional) | <0.168 | <0.164 | <0.160 | | internal |

The following test methods were utilized for the purposes of the present invention to characterize the raw materials and the films:

SV (standard viscosity)

Standard viscosity SV (DCA) is measured in dichloroacetic acid by a method based on DIN 53726. Intrinsic viscosity (IV) is calculated as follows from standard viscosity IV (DCA)=$6.907 \cdot 10^{-4}$ SV (DCA)+0.063096

Coefficient of friction (COF)

Coefficient of friction was determined to DIN 53 375. The coefficient of sliding friction was measured 14 days after production.

Surface tension

Surface tension was determined by what is known as the ink method (DIN 53 364).

Haze

Hölz haze was measured by a method based on ASTM D 1003-52 but, in order to utilize the most effective measurement range, measurements were made on four pieces of film laid one on top of the other, and a 1° slit diaphragm was used instead of a 4° pinhole.

Gloss

Gloss was determined to DIN 67 530. Reflectance was measured, as an optical value characteristic of a film surface. Based on the standards ASTM-D 523-78 and ISO 2813, the angle of incidence was set at 20° or 60°. A beam of light hits the flat test surface at the set angle of incidence and is reflected and/or scattered thereby. A proportional electrical variable is displayed representing light rays hitting the photoelectronic detector. The value measured is dimensionless and must be stated together with the angle of incidence.

Surface gas flow time

The principle of the test method is based on the air flow between one side of the film and a smooth silicon wafer sheet. The air flows from the surroundings into an evacuated space, and the interface between film and silicon wafer sheet acts as a flow resistance.

A round specimen of film is placed on a silicon wafer sheet in the middle of which there is a hole providing the connection to the receiver. The receiver is evacuated to a pressure below 0.1 mbar. The time in seconds taken by the air to establish a pressure rise of 56 mbar in the receiver is determined.

Test conditions:

| Test area | 45.1 cm² |
| --- | --- |
| Weight applied | 1276 g |
| Air temperature | 23° C. |
| Humidity | 50% relative humidity |
| Aggregated gas volume | 1.2 cm³ |
| Pressure difference | 56 mbar |

Determination of planar orientation Δp

Planar orientation is determined by measuring the refractive index with an Abbe refractometer according to internal operating prescription 24.

| Preparation of specimens: | |
| --- | --- |
| Specimen size and length: | from 60 to 100 mm |
| Specimen width: | corresponds to prism width of 10 mm |

To determine $n_{MD}$ and $n_a$ (=$n_z$), the specimen to be tested has to be cut out from the film with the running edge of the specimen running precisely in the direction TD. The specimens are to be taken from the middle of the film web. Care must be taken that the temperature of the Abbe refractometer is 23° C. Using a glass rod, a little diiodomethane (N=1.745) or diiodomethane-bromo-naphthalene mixture is applied to the lower prism, which has been cleaned thoroughly before the test. The refractive index of the mixture must be greater than 1.685. The specimen cut out in the direction TD is firstly laid on top of this, in such a way that the entire surface of the prism is covered. Using a paper wipe the film is now firmly pressed flat onto the prism, so that it is firmly and smoothly positioned thereon. The excess liquid must be sucked away. A little of the test liquid is then dropped onto the film. The second prism is swung down and into place and pressed firmly into contact. The right-hand knurled screw is then used to turn the indicator scale until a transition from light to dark can be seen in the field of view in the range from 1.62 to 1.68. If the transition from light to dark is not sharp, the colors are brought together using the upper knurled screw in such a way that only one light and one dark zone are visible. The sharp transition line is brought to the crossing point of the two diagonal lines (in the eyepiece) using the lower knurled screw. The value now indicated on the measurement scale is read off and entered into the test record. This is the refractive index $n_{MD}$ in the machine direction. The scale is now turned using the lower knurled screw until the range visible in the eyepiece is from 1.49 to 1.50.

The refractive index $n_a$ or $n_z$ (in the direction of the thickness of the film) is then determined. To improve the visibility of the transition, which is only weakly visible, a polarization film is placed over the eyepiece. This is turned until the transition is clearly visible. The same considerations apply as in the determination of $n_{MD}$. If the transition from light to dark is not sharp (colored), the colors are brought together using the upper knurled screw in such a way that a sharp transition can be seen. This sharp transition line is brought into the crossing point of the two diagonal lines using the lower knurled screw, and the value indicated on the scale is read off and entered into the table.

The specimen is then turned, and the corresponding refractive indices $n_{MD}$ and $n_a$ (=$n_z$) of the other side are measured and entered into an appropriate table.

After determining the refractive indices in, respectively, the direction MD and the direction of the thickness of the film, the specimen strip cut out in the direction MD is placed in position and the refractive indices $n_{TD}$ and $n_a$ (=$n_z$) are determined accordingly. The strip is turned over, and the values for the B side are measured. The values for the A side and the B side are combined to give average refractive indices. The orientation values are then calculated from the refractive indices using the following formulae:

$$\Delta n = n_{MD} - n_{TD}$$

$$\Delta p = (n_{MD} + n_{TD})/2 - n_z$$

$$n_{av} = (n_{MD} + n_{TD} + n_z)/3$$

Measurement of median diameter $d_{50}$

The median diameter $d_{50}$ was measured by laser on a Malvern MasterSizer by the standard method (examples of other measurement devices are the Horiba LA 500 or Sympathec Helos, which use the same principle of measurement). For the tests, the specimens were placed in a cell with water, and this was then placed into the test device. The test procedure is automatic and includes the mathematical determination of the $d_{50}$ value.

The $d_{50}$ value here is determined as defined from the (relative) cumulative particle size distribution curve: the point of intersection of the 50% ordinate with the cumulative curve directly gives the desired $d_{50}$ value on the abscissa axis.

FIG. 1 shows how this is done in more detail.

Measurement of SPAN 98

The test device used to determine SPAN 98 was the same as that described above for the determination of median diameter $d_{50}$. SPAN 98 is defined here as follows:

$$SPAN98 = \frac{d_{98} - d_{10}}{d_{50}}$$

Figure 2:
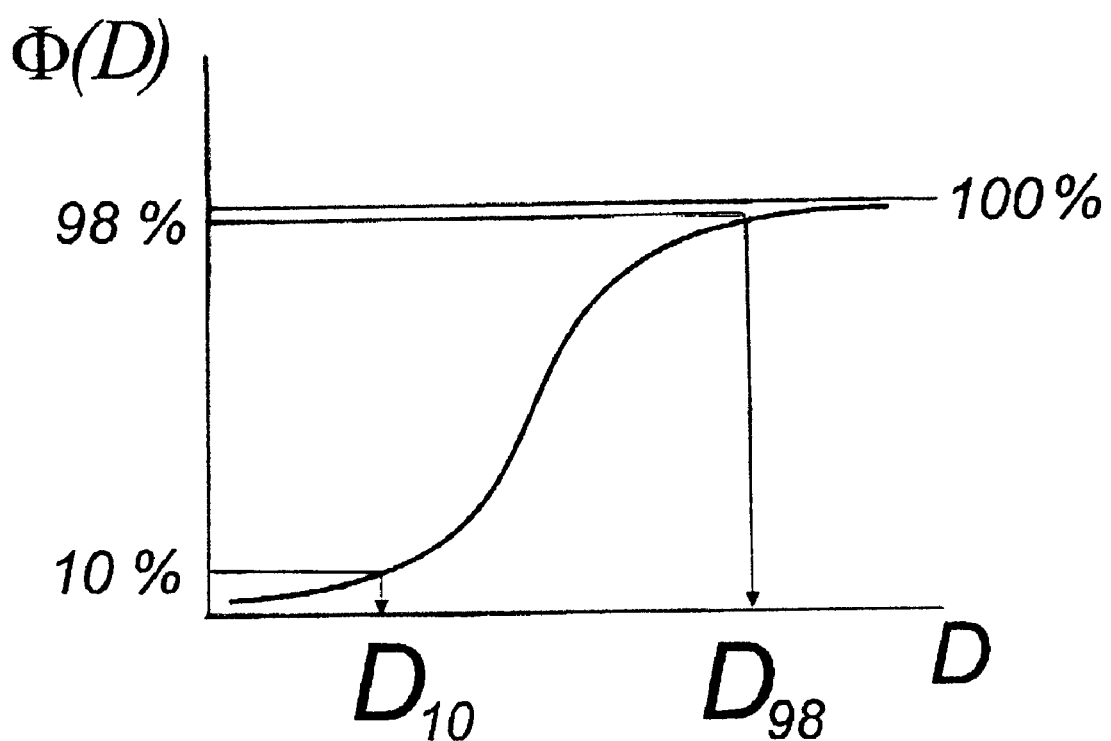

The (relative) cumulative particle size distribution curve is again used as a basis for determining $d_{98}$ and $d_{10}$. The point of intersection of the 98% ordinate value with the cumulative curve gives the desired $d_{98}$ value directly on the abscissa axis, and the point of intersection of the 10% ordinate value with the cumulative curve gives the desired $d_{10}$ value directly on the abscissa axis. FIG. 2 shows more detail of the precise method involved.

EXAMPLE 1

Chips made from polyethylene terephthalate (prepared by the transesterification process with Mn as transesterification catalyst, Mn concentration: 100 ppm) were dried at 150° C. to residual moisture below 100 ppm and fed to the extruder for the base layer (B).

A matt, one-layer film with a total thickness of 23 μm was then produced by extrusion followed by stepwise longitudinal and transverse orientation.

The film was a mixture made from:

| | |
|---|---|
| 60% by weight of | polyethylene terephthalate with SV of 800 and |
| 40% by weight of | masterbatch made from 95% by weight of polyethylene terephthalate and 5.0% by weight of silica particles (®Sylysia 430 from Fuji, Japan) with $d_{50}$ value of 3.4 μm and SPAN 98 of 1.4. |

The production conditions in each step of the process were:

| | | |
|---|---|---|
| Extrusion: | Temperatures | 290° C. |
| | Take-off roll temperature | 30° C. |
| Longitudinal stretching: | Temperature: | 80–126° C. |
| | Longitudinal stretching ratio: | 4.0 |
| Transverse stretching: | Temperature: | 80–135° C. |
| | Transverse stretching ratio | 4.0 |
| Setting: | Temperature: | 230° C. |
| | Duration: | 3 s |

The film had the required low gloss and the required low haze. Furthermore, the film exhibits the required handling and the required processing performance. Tables 2 and 3 show the structure of the films and the properties achieved in films produced in this way.

EXAMPLE 2

The makeup of the film was changed from that of Example 1: the film was a mixture made from:

| | |
|---|---|
| 50% by weight of | polyethylene terephthalate with SV of 800 and |
| 50% by weight of | masterbatch made from 95% by weight of polyethylene terephthalate and 5.0% by weight of silica particles (®Sylysia 430 from Fuji, Japan) with $d_{50}$ value of 3.4 μm and SPAN 98 of 1.4. |

The result was an improvement in the degree of mattness of the film.

EXAMPLE 3

The makeup of the film was changed from that of Example 2:

the film was a mixture made from:

| | |
|---|---|
| 40% by weight of | polyethylene terephthalate with SV of 800 and |
| 60% by weight of | masterbatch made from 95% by weight of polyethylene terephthalate and 5.0% by weight of silica particles (®Sylysia 430 from Fuji, Japan) with $d_{50}$ value of 3.4 μm and SPAN 98 of 1.4. |

EXAMPLE 4

The makeup of the film was changed from that of Example 3. Instead of the polyethylene terephthalate with SV value of 800, 20% by weight of the polymeric component I were now added to the film. This component I has the following makeup:

a) 90 mol % of isophthalic acid;

b) 10 mol % of the sodium salt of 5-sulfoisophthalic acid.

Introducing component I into the film further reduced the gloss of the film and improved its transparency.

Base layer (B) was a mixture made from:

| | |
|---|---|
| 20% by weight of | polyethylene terephthalate with SV value of 800 |
| 20% by weight of | component I and |
| 60% by weight of | masterbatch made from 95% by weight of polyethylene terephthalate and 5.0% by weight of silica particles (®Sylysia 430 from Fuji, Japan) with $d_{50}$ value of 3.4 μm and SPAN 98 of 1.4. |

COMPARATIVE EXAMPLE 1

Unlike in Example 1, the film was now formulated with a pigment system corresponding to the prior art of U.S. Pat. No. 3,154,461. The degree of mattness of the film deteriorated markedly.

The film was a mixture made from:

| | |
|---|---|
| 40% by weight of | polyethylene terephthalate with SV of 800 |
| 60% by weight of | masterbatch made from 95% by weight of polyethylene terephthalate and 5.0% by weight of silica particles with $d_{50}$ value of 5.5 μm and SPAN 98 of 2.0 |

TABLE 2

| Example | Film thickness μm | Pigments used | Median pigment diameter in film [μm] | Span 98 | Pigment concentration ppm |
|---|---|---|---|---|---|
| E 1 | 23 | Sylysia 430 | 3.4 | 1.4 | 20 000 |
| E 2 | 23 | Sylysia 430 | 3.4 | 1.4 | 25 000 |
| E 3 | 23 | Sylysia 430 | 3.4 | 1.4 | 30 000 |
| E 4 | 23 | Sylysia 430 | 3.4 | 1.4 | 30 000 |
| CE 1 | 23 | $SiO_2$ | 5.5 | 2 | 30 000 |

TABLE 3

| Ex. | Coefficient of friction COF | Average roughness $R_a$ [nm] | Values measured for gas flow [sec] | Δp | Gloss | Haze [%] |
|---|---|---|---|---|---|---|
| E 1 | 0.44 | 230 | 12 | 0.164 | 35 | 65 |
| E 2 | 0.43 | 237 | 8 | 0.164 | 20 | 75 |
| E 3 | 0.41 | 250 | 6 | 0.164 | 15 | 80 |
| E 4 | 0.37 | 270 | 5 | 0.164 | 14 | 55 |
| CE 1 | 0.45 | 220 | 12 | 0.164 | 55 | 70 |

What is claimed is:

1. A matt, biaxially oriented polyester film having at least one base layer (B) which comprises at least 70% by weight of thermoplastic polyester essentially consisting of ethylene glycol units and of terephthalic acid units, wherein the film also comprises a pigment system which has the following features:
   a) the median diameter ($d_{50}$) of the pigment grains is in the range from 2.1 to 4.9 μm,
   b) the scattering of the distribution of the grain size of the pigment grains, expressed via the SPAN 98, is less than or equal to 1.9, and
   c) the concentration of pigment grains is in the range from 1.0 to 10% by weight, based on the total weight of the film.

2. The matt polyester film as claimed in claim 1, wherein the film comprises a pigment system which has a SPAN 98 less than or equal to 1.8.

3. The matt polyester film as claimed in claim 1, wherein the pigment concentration in the film is in the range from 1.1 to 7.5% by weight.

4. The matt polyester film as claimed in claim 1, which has a thickness in the range from 3 to 350 μm.

5. Flexible packaging comprising a film according to claim 1.

6. A polyester film according to claim 1 comprising only one layer, said one layer being the base layer (B).

7. A process for producing a matt polyester film as claimed in claim 6 by extrusion, in which a melt corresponding to the film is extruded through a flat-film die, the resultant film is drawn off for solidification on one or more rollers, the film is then biaxially stretched, and the biaxially stretched film is heat-set, which comprises extruding the melt having a pigment system which has the following features:
   a) the median diameter ($d_{50}$) of the pigment grains is in the range from 2.1 to 4.9 μm,
   b) the scattering of the distribution of the grain size of the pigment grains, expressed via the SPAN 98, is less than or equal to 1.9, and
   c) the concentration of pigment grains is in the range from 1.0 to 10% by weight, based on the total weight of the film,
and carrying out the biaxial stretching by longitudinal stretching at a temperature in the range from 80 to 130° C. and a stretching ratio in the range from 2.5:1 to 6:1 and by transverse stretching at a temperature in the range from 90 to 150° C. and a stretching ratio in the range from 3.0:1 to 5.0:1.

8. The process as claimed in claim 7, wherein the stretching parameters set are such that the planar orientation Δp of the film is less than 0.168.

9. The process as claimed in claim 7, wherein cut material arising during the process to produce the film is reintroduced to the extrusion process as regrind in amounts in the range up to 70% by weight, based on the total weight of the film.

10. A polyester film according to claim 6, wherein the pigment system is present in an amount of from 1.1 to 7.5% based on the weight of the base layer (B).

11. A polyester film according to claim 1, wherein the pigment system is $SiO_2$ particles in colloidal or chain-type form.

12. A matt, biaxially oriented polyester film, having at least one base layer (B) which comprises at least 70% by weight of thermoplastic polyester essentially consisting of ethylene glycol units and of terephthalic acid units, wherein the film also comprises a pigment system which has the following features:
   a) the median diameter ($d_{50}$) of the pigment grains is in the range from 2 to 5 μm.
   b) the scattering of the distribution of the grain size of the pigment grains, expressed via the SPAN 98, is less than or equal to 1.9, and
   c) the concentration of pigment grains is in the range from 1.0 to 10% by weight, based on the total weight of the film,
said film also comprising besides the thermoplastic polyester, another polymeric component I which is a copolymer composed of the condensation product of the following monomers or, respectively, their derivatives capable of forming polyesters:
   e) from 65 to 95 mol % of isophthalic acid;
   f) from 0 to 30 mol % of at least one aliphatic dicarboxylic acid acid having the formula $HOOC(CH_2)_nCOOH$, where n is in the range 1 to 11;
   g) from 5 to 15 mol % of at least one sulfomonomer containing an alkali metal sulfonate group on the aromatic moiety of a dicarboxylic acid; and
   h) a copolymerizible aliphatic or cycloaliphatic glycol having from 2 to 11 carbon atoms, in the stoichiometric amount necessary to form 100 mol % of the condensation product;
where each of the percentages is based on the total amount of monomers forming component I.

13. The matt polyester film as claimed in claim 12, which comprises up to 30% by weight of component I, based on the total weight of the film.

14. The polyester film according to claim 13 comprising only one layer, said one layer being the base layer (B).

15. A polyester film according to claim 12, wherein the pigment system has a median diameter ($d_{50}$) of the pigment grains in the range from 2.1 to 4.9 μm.

16. A matt, biaxially oriented polyester film having at least one base layer (B) which comprises at least 70% by weight of thermoplastic polyester essentially consisting of ethylene glycol units and terephthalic acid units, wherein the film also comprises a pigment system which has the following features:

a) the median diameter ($d_{50}$) of the pigment grains is in the range from 2 to 5 μm.
b) the scattering of the distribution of the grain size of the pigment grains, expressed via the SPAN 98, is less than or equal to 1.9, and
c) the concentration of pigment grains is in the range from 1.0 to 10% by weight, based on the total weight of the film, which film has a roughness, expressed via its $R_a$ value, in the range from 150 to 1000 nm, and wherein the value measured for gas flow is in the range from 1 to 50 s.

17. The polyester film according to claim 16 comprising only one layer, said one layer being the base layer (B).

18. A polyester film according to claim 16, wherein the pigment system has a median diameter ($d_{50}$) of the pigment grains in the range from 2.1 to 4.9 μm.

19. A matt, biaxially oriented polyester film having at least one base layer (B), which base layer (B) comprises at least 70% by weight of thermoplastic polyester at least 90 mol % of which is composed of ethylene glycol units and terephthalic acid units with the remaining units being derived from other aliphatic, cycloaliphatic or aromatic diols and other aliphatic, cycloaliphatic or aromatic dicarboxylic acids, wherein the film also comprises a pigment system which has the following features;
a) the median diameter ($d_{50}$) of the pigment grains is in the range from 2.1 to 4.9 μm.
b) the scattering of the distribution of the grain size of the pigment grains, expressed via the SPAN 98, is less than or equal to 1.9, and
c) the concentration of pigment grains is in the range from 1.0 to 10% by weight, based on the total weight of the film.

20. A polyester film according to claim 19 comprising only one layer, said one layer being the base layer (B).

21. A polyester film according to claim 20, wherein said other aliphatic, cycloaliphatic or aromatic diols are selected from the group consisting of diethylene glycol, triethylene glycol, aliphatic glycols of the formula HO—$(CH_2)_n$—OH where n is an integer from 3 to 6, branched aliphatic glycols having up to 6 carbon atoms, cyclohexanediols and aromatic diols of the formulae HO—$C_6H_4$—$C_6H_4$—OH and HO—$C_6H_4$—X—$C_6H_4$—OH, wherein X is —$CH_2$—, —$C(CH_3)_2$—, —$C(CF_3)_2$—, —O—, —S— or —$SO_2$—, and said other aliphatic, cycloaliphatic or aromatic dicarboxylic acid; are selected from the group consisting of benzene dicarboxylic acids, naphthalene dicarboxylic acids, biphenyl-x,x'-dicarboxylic acids, diphenylacetylene-x,x'-dicarboxylic acids, stilbene-x,x'-dicarboxylic acids, cyclohexanedicarboxylic acids and $C_3$–$C_{19}$ alkanediacids.

22. A polyester film according to claim 21 which has a roughness, expressed via its $R_a$ value, in the range from 150 to 1000 nm, and wherein the value measured for gas flow is in the range from 1 to 50 s.

23. A polyester film according to claim 21, wherein the pigment system is $SiO_2$ particles in colloidal or chain-type form.

24. A polyester film according to claim 20, which also comprises, besides the thermoplastic polyester, up to 30% by weight, based on the total weight of the film, of a polymeric component I which is a copolymer composed of the condensation product of the following monomers or, respectively, their derivatives capable of forming polyesters:
e) from 65 to 95 mol % of isophthalic acid;
f) from 0 to 30 mol % of at least one aliphatic dicarboxylic acid acid having the formula HOOC$(CH_2)_n$COOH, where n is in the range 1 to 11;
g) from 5 to 15 mol % of at least one sulfomonomer containing an alkali metal sulfonate group on the aromatic moiety of a dicarboxylic acid; and
h) a copolymerizible aliphatic or cycloaliphatic glycol having from 2 to 11 carbon atoms, in the stoichiometric amount necessary to form 100 mol % of the condensation product;

wherein each of the percentages is based on the total amount of monomers forming component I.

25. A polyester film according to claim 20 which has a roughness, expressed via its $R_a$ value, in the range from 150 to 1000 nm, and wherein the value measured for gas flow is in the range from 1 to 50 s.

* * * * *